United States Patent [19]

Tanigawa

[11] Patent Number: 4,979,060
[45] Date of Patent: Dec. 18, 1990

[54] TAPE CHANGE MECHANISM FOR CASSETTE APPARATUS

[75] Inventor: Takashi Tanigawa, Sagamihara, Japan

[73] Assignee: Tandy Electronic Japan, Ltd., Tokyo, Japan

[21] Appl. No.: 231,769

[22] Filed: Aug. 12, 1988

[30] Foreign Application Priority Data

Apr. 6, 1987 [JP] Japan .................................. 62-86787

[51] Int. Cl.[5] ............................................ G11B 15/68
[52] U.S. Cl. ...................................... 360/92; 292/199
[58] Field of Search ........ 414/273, 276, 277, 280–283, 414/659–663; 369/34, 36–39; 360/92, 98.04–98.06; 242/197–201

[56] References Cited

U.S. PATENT DOCUMENTS

| | | | |
|---|---|---|---|
| 3,650,413 | 3/1972 | Weigel | 360/92 |
| 4,195,796 | 4/1980 | Osanai | 360/92 X |
| 4,519,009 | 5/1985 | Bolick | 360/92 |
| 4,541,076 | 10/1985 | Bowers et al. | 365/230.05 |
| 4,610,004 | 9/1986 | Moller et al. | 365/230.05 |
| 4,616,310 | 10/1986 | Dill et al. | 365/230.05 |
| 4,623,990 | 11/1986 | Allen et al. | 365/230.05 |
| 4,627,030 | 12/1986 | Barber | 365/230.05 |
| 4,660,177 | 4/1987 | O'Connor | 365/230.05 |

OTHER PUBLICATIONS

Electronic Design, 4/14/88, N. Siddique et al., "Metastable-Free Arbitrator Coordinates Processors", pp. 107–112.

Primary Examiner—A. J. Heinz
Attorney, Agent, or Firm—Wolf, Greenfield & Sacks

[57] ABSTRACT

A tape cartridge apparatus comprises a head base slidably provided on a frame and having at least a head for recording and reproducing a signal on and from a tape in a predetermined cassette tapeout of plurality of cassette tapes in a normal operating position. A tape holder is provided on the frame for holding the cassette tapes and rotatable and movable up and down with respect to the frame, where the predetermined cassette tape is in the normal operating position when the holder takes a first rotary position. An elevator mechanism is employed for raising and lowering the tape holder between a lowered position and a raised position in a predetermined angle in the cassette changing mode. A moving mechanism is used for moving the head base between a operating position and a receded position. The moving mechanism first moves the head base to the receded position in the cassette changing mode so that the tape holder in the raised position is rotated the predetermined angle to a second rotary position and then returns the head base to the operating position when the tape holder returns to the lowered position, thereby setting a cassette tape other than the predetermined cassette tape in the normal operating position.

38 Claims, 10 Drawing Sheets

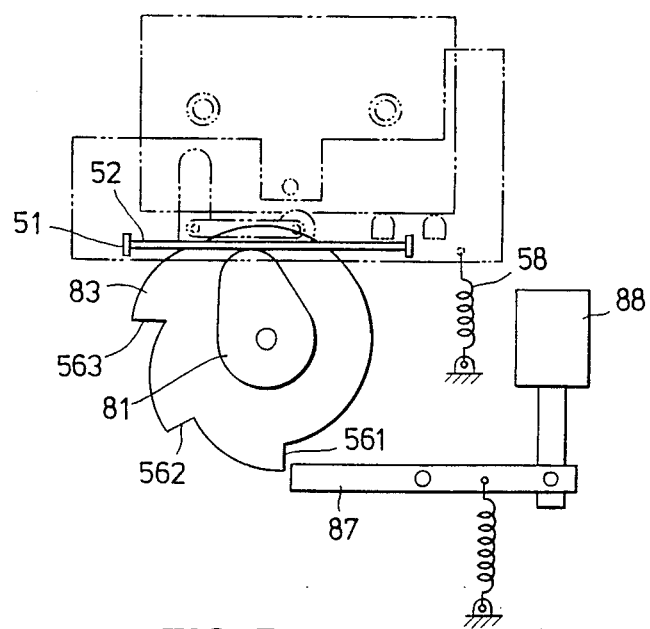
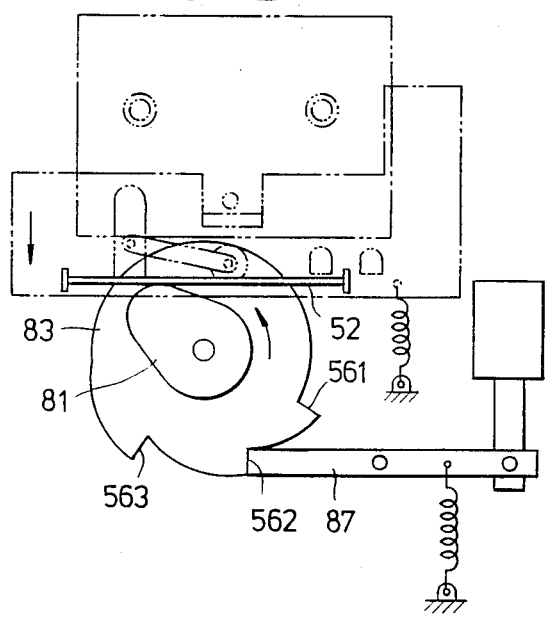

TAPE CHANGE MECHANISM FOR CASSETTE APPARATUS

BACKGROUND OF THE INVENTION

1. Field of the Invention

The present invention generally relates to cassette apparatuses, and pertains more particularly to a cassette apparatus, such as an answering machine, which uses double cassette tapes and is provided with a tape changing mechanism.

2. BACKGROUND DISCUSSION

FIG. 1 shows an example of the conventional answering machine of the type which accommodates a plurality of cassette tapes, in this case, two cassette tapes. A first cassette tape Ca is used to record an answering message to let a caller know that the user of the answering machine is not there and ask the caller to record a message. A second cassette tape Cr is used to record the caller's message.

FIG. 2 shows a driving mechanism for the two cassette tapes Ca and Cr. The driving mechanism generally comprises a head base 11 slidable in directions $A_1$ and $A_2$, a recording and reproducing head 12 and an erase head 13 mounted on the head base 11, a capstan 14, a pinch roller 15 for transporting a tape in a state pinched between the capstan 14 and the pinch roller 15, and a solenoid 16 for sliding the head base 11 in the directions $A_1$ and $A_2$. The driving mechanism further comprises a flywheel 17 fixed coaxially to the capstan 14, a driving device including a motor 18 for driving a supply reel drive sprocket 19 and a take-up reel drive sprocket 20, and a rotation detecting mechanism 21 for detecting a rotational state of the supply reel drive 19. In the driving mechanism, the heads 12 and 13, the solenoid 16 and the motor 18 are expensive in comparison to the remaining parts.

According to the conventional answering machine which uses two cassette tapes, the driving mechanism shown in FIG. 2 must be provided independently for the cassette tapes Ca and Cr. In other words, two driving mechanisms must be provided in the answering machine. As a result, the number of parts constituting the conventional answering machine is large, and the conventional answering machine inevitably is expensive.

SUMMARY OF THE INVENTION

Accordingly, it is a general object of the present invention to provide a novel and useful cassette apparatus in which the problems described heretofore are eliminated To accomplish the foregoing and other objects, features and advantages in accordance ,with the present invention, there is provided a tape cartridge apparatus for recording and reproducing a signal on and from a tape in a selected one of a plurality of cassette tapes set therein. In accordance with the present invention there are basically two separate tape cartridge embodiments set forth herein. In one embodiment the tapes are contained in separate tape cartridges while in another embodiment the tapes are contained in a single integral tape cartridge. In both embodiments the apparatus comprises a frame, a head base provided on the frame and slidable between an operating position and receded position, where the head base comprises at least a recording and reproducing head for recording and reproducing a signal on and from a tape in a predetermined cassette tape in a normal operating position, and a tape holder provided on the frame for holding the plurality of two cassette tapes; the tape holder is rotatable and movable up and down with respect to the frame and the predetermined cassette tape is set in the normal operating position when the holder takes a first rotary position. An elevator mechanism is provided for raising and lowering the tape holder between a lowered position and a raised position in a cassette changing mode in which a selection of a cassette tape is made. A rotating mechanism is provided for rotating the tape holder in the raised position a predetermined angle in the cassette changing mode, and a moving mechanism is provided for moving the head base between the operating position and the receded position. The moving mechanism first moves the head base to the receded position in the cassette changing mode so that the tape holder in the raised position is rotated the predetermined angle to a second rotary position and then returns the head base to the operating position when the tape holder returns to the lowered position, thereby setting a cassette tape other than the predetermined cassette tape in the normal operating position. According to the tape cartridge apparatus of the present invention, it is possible to selectively play and/or record on one of the cassette tapes by rotating the tape holder the predetermined angle by use of a mechanism having a simple construction. It is sufficient to provide only one head base mounted with the head and the like. For this reason, it is possible to considerably reduce the number of parts nd accordingly reduce the production cost of the tape cartridge apparatus. In addition, it is possible to downsize the tape cartridge apparatus as a whole.

Other objects and further features of the present invention will be apparent from the following detailed description when read in conjunction with the accompanying drawings.

BRIEF DESCRIPTION OF THE DRAWINGS

FIGS. 7A, 7B and 7C are plan views respectively showing the positional relationship of a head base and a drive cam in a recording and reproducing position, a cassette changing position, and a fast forward and rewind position;

DETAILED DESCRIPTION

Figure 1:
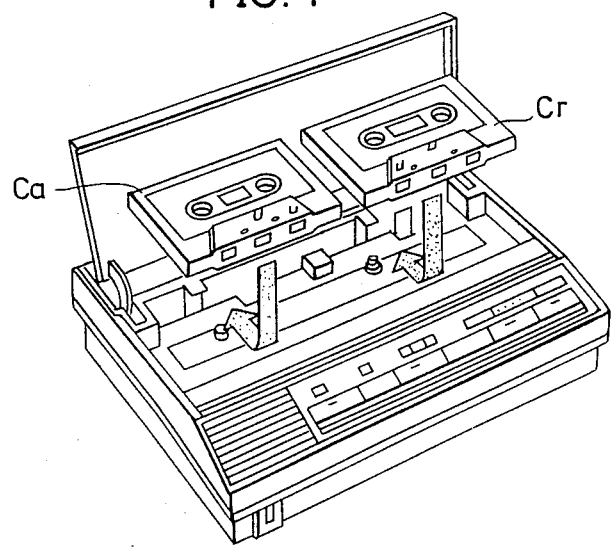
FIG. 1 is a perspective view generally showing an example of the conventional answering machine.
Figure 2:
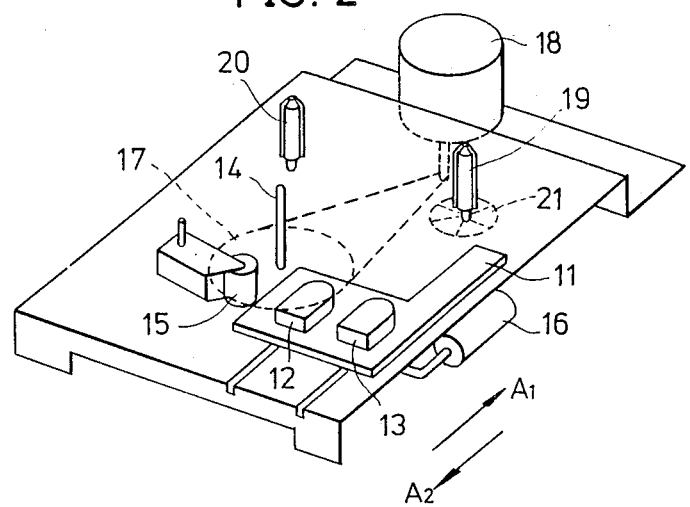
FIG. 2 is a perspective view showing an essential part of a driving mechanism of the conventional answering machine.
Figure 3:
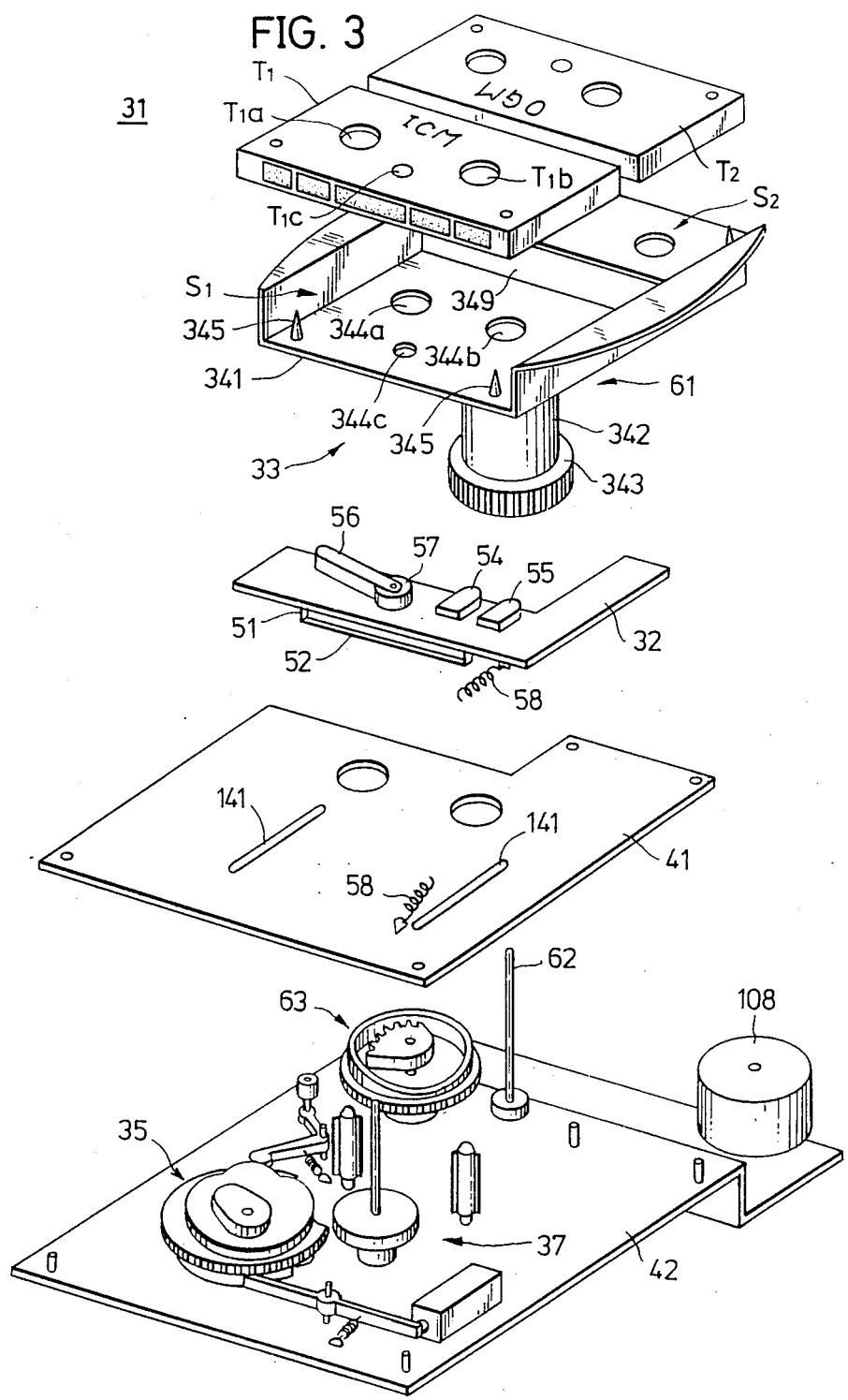
FIG. 3 is a disassembled perspective view showing as essential part of a first embodiment of the tape cartridge apparatus according to the present invention.

FIG. 3 shows a disassembled perspective view of an essential part of a first embodiment of a tape cartridge apparatus according to the present invention. A tape cartridge apparatus 31 comprises upper and lower frames 41 and 42 which are separated by a predetermined distance from each other, a head base 32 provided on the upper frame 41 and slidable parallel to the upper frame 41, a cassette changing device 33 provided on the lower frame 42, a head base positioning device 35 provided between the upper, and lower frames 41 and 42, and a tape driving mechanism 37 of known construction provided on the lower frame 42. The head base 32, the cassette changing device 33 and the head base positioning device 35 constitute the cassette tape chancing mechanism of the present embodiment. The cassette tape changing mechanism will hereinafter simply referred to as a changing mechanism.

Figure 4:
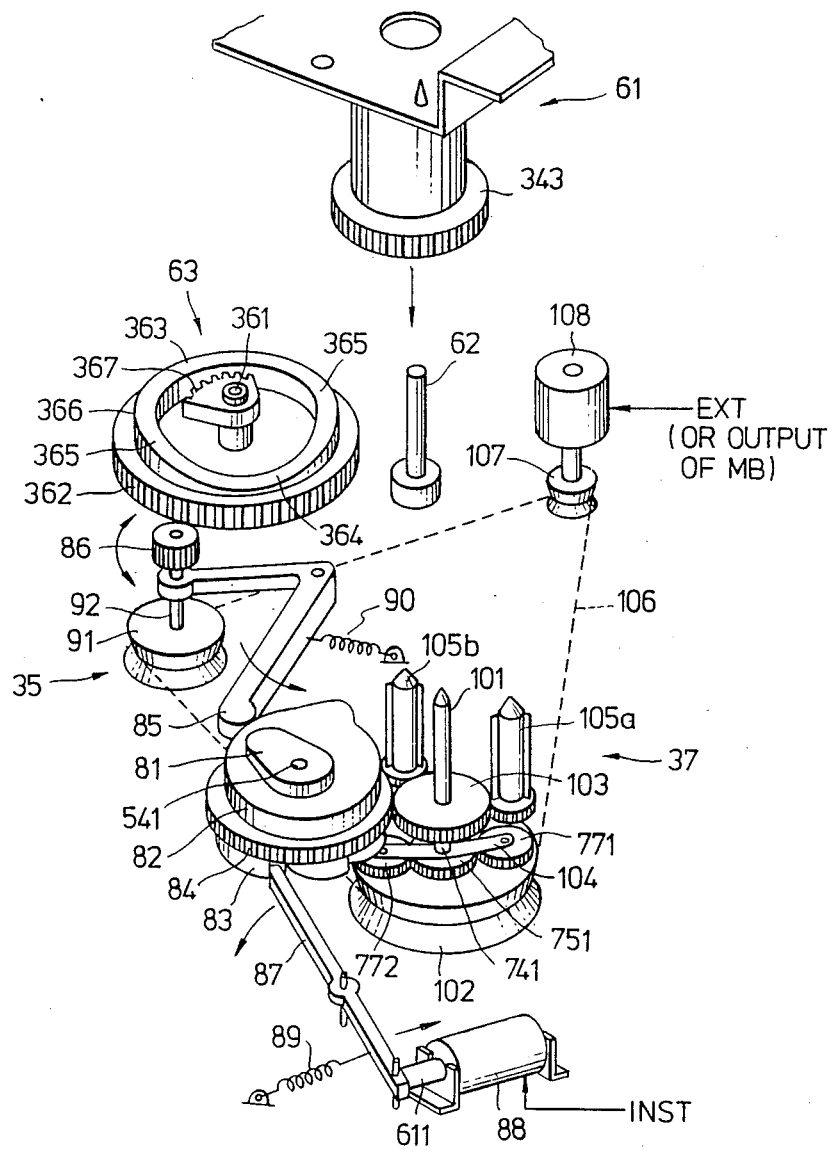
FIG. 4 is a disassembled perspective view showing a cassette changing device and a tape driving mechanism of the first embodiment.

FIG. 4 shows a disassembled perspective view of the cassette changing device 33 and the tape driving mechanism 37 of the changing mechanism. With regard to FIGS. 3 and 4, the head base 32 has legs 51 which penetrate a pair of parallel guide holes 141 in the upper frame 41, and a horizontal rod 52 connecting tip ends of the legs 51. A recording and reproducing head 54 for recording and reproducing a signal on and from a tape, and an erase head 55 are fixed on the head base 32. An arm 56 is pivotally provided on the head base 32, and a pinch roller 57 is rotatably provided on a free end of the arm 56. This pinch roller 57 cooperates with a capstan 101 of the tape driving mechanism 37 which will be described later in the specification. A coil spring 58 is provided between an end of the head base 32 and the upper frame 41, and this coil spring 58 pulls the head base 32 towards a driving cam 81 which will be described later.

The cassette chancing device 33 comprises a tape holder 61 for holding a plurality of cassette tapes and an elevator cam 63 for raising and lowering the tape holder 61. In the present embodiment, the tape holder 61 holds two cassette cartridges containing magnetic recording (cassette) T1 and T2. The tape holder 61 is supported on a spindle 62 which is located vertically on a rear portion of the lower frame 42, and the tape holder 61 is rotatable about the spindle 62 and is movable up and down along the spindle 62. The tape holder 61 has a receiving part 341 for receiving the two cartridges containing cassette tapes T1 and T2 arranged in such a manner that tapes T1 and T2 are both exposed to the outside in mutually opposite directions as shown in FIG. 3. The receiving part 341 has a partitioning plate 349 for partitioning the space on the receiving part 341 into a space S1 for receiving the cassette tape T1 and a space S2 for receiving the cassette tape T2. The receiving part 341 also has holes 344a, 344b and 344c in each of the partitioned spaces S1 and S2 for respectively receiving supply and take-up reel drive sprockets 105a and 105b and the capstan 101 shown in FIG. 4 which penetrates through these holes 344a, 344b and 344c. In addition, the receiving part 341 has a pair of positioning projections 345 in each of the partitioned spaces S1 and S2 for engaging respective holes in the cartridge means containing cassette tapes T1 and T2 to prevent the cartridge means containing cassette tapes T1 and T2 from slipping out of position during a cassette changing operation. It is possible to provide a cover (not shown) on the receiving part 341 to hold down the cassette tapes T1 and T2 in position so as to prevent the cassette tapes T1 and T2 from slipping out of position during the cassette changing operation. A shaft 342 extends downwardly from a central bottom surface of the receiving part 341. This shaft 342 fixed to the receiving part 341 is fitted rotatably on the spindle 62 which supports the tape holder 61. A pinion 343 is mounted on a lower end of the shaft 342, and this pinion 343 meshes a selector gear 367 of the elevator cam 63 as will be described later.

As shown in FIG. 4, the elevator cam 63 is fixed on a shaft 361 rotatably provided on the lower frame 42 and an elevator cam gear 362 is formed on a lower portion thereof. The elevator cam gear 362 meshes a driving gear 86 which will be described later. The elevator cam 63 has cam surface 366 which is made up of a crest portion 363, a root portion 364 located diametrically to the crest portion 363, and slope portions 365 which connect the crest and root portions 363 and 364. The elevator cam 63 engages the pinion 343 to raise and lower the tape holder 61. The selector gear 367 is provided within an inner central portion of the cam surface 366. The selector gear 367 is arranged at such a height position that the selector gear 367 meshes the pinion 343 to rotate the pinion 343 when the tape holder 61 is raised by the cam surface 366. In the present embodiment, the selector gear 367 has a fan shape.

A ratio between diameters of the selector gear 367 and the pinion 343 of the tape holder 61 is set to 2:1, so that the pinion 343 of the tape holder 61 undergoes 1 revolution when the selector gear 367 undergoes ¼ revolution. The selector gear 367 is mounted with its teeth facing the crest portion 363 of the cam surface 366, so that the selector gear 367 meshes the pinion 343 of the tape holder 61 at the crest portion 363 of the cam surface 366 and disengages from the pinion 343 after rotating the pinion 343 for ½ revolution.

Figure 5:
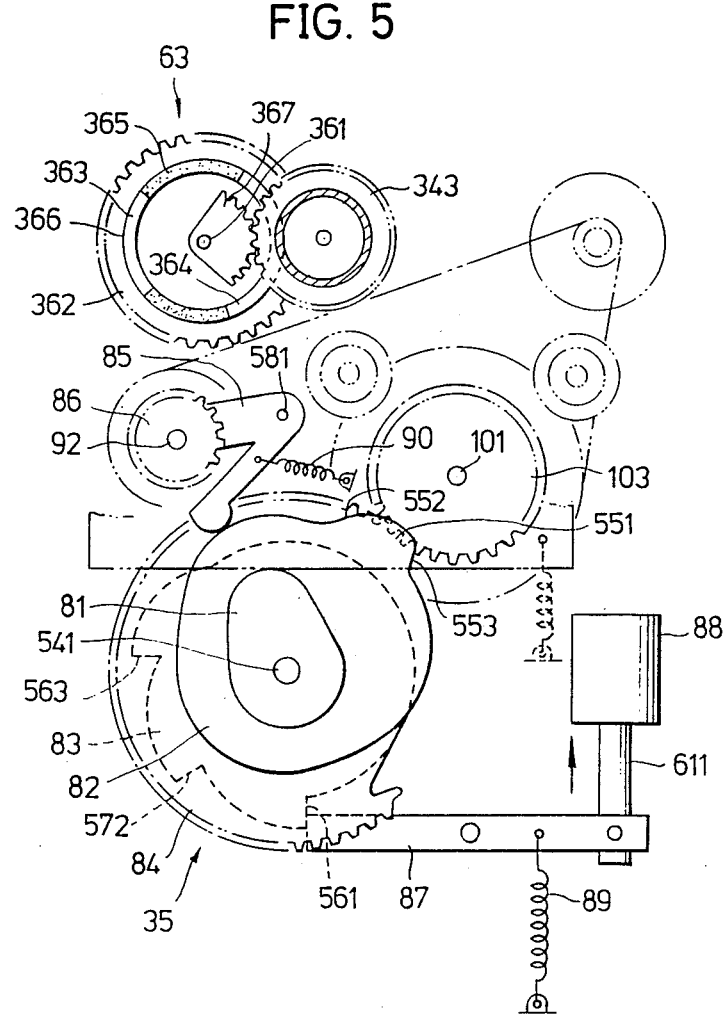
FIG. 5 is a plan view showing the cassette changing device and the tape driving mechanism.

As shown in FIGS. 4 and 5, the head base positioning device 35 comprises the driving cam 81, a selector cam 82, a set cam 83, a gear cam 84, a lever 85, the driving gear 86, a solenoid lever 87, a solenoid 88, and a coil spring 89. The driving cam 81 is rotatably mounted on a cam shaft 541 located on the lower frame 42 adjacent to the head base 32, and engages the horizontal rod 52 of the head base 32 to move the horizontal rod 52 and thus the head base 32. The selector cam 82 is mounted coaxially to the driving cam 81. The selector cam 82 is engaged and rotated by the lever 85 to the driving gear 86 as the driving cam 81 rotates. The set cam 83 is mounted coaxially to the driving cam 81, and sets the tape cartridge apparatus 31 to one of a recording and reproducing mode, cassette changing mode and a fast forward and rewind mode. The gear cam 84 is mounted coaxially to the driving cam 81, and operates the set cam 83 from a set position 563 for the fast forward and rewind mode to a set position 561 for the recording and reproducing mode. The lever 85 is provided slidably on the lower frame 42 between the elevator cam 63 and the selector cam 82 The lever 85 is engaged and pivoted by the selector cam 82. The driving gear 86 is mounted on a free end of the lever 85 and engages the elevator cam gear 362 when the lever 85 pivots. The solenoid lever 87 engages a claw portion of the set cam 83 and stops the set cam 83 at each of the three set positions. The solenoid 88 is coupled to one end of the solenoid lever 87 by a pin and drives the solenoid lever 87. The spring 89 returns the lever 85 driven by the solenoid 88 back to an original position.

A root portion of the driving cam 81 has a circular shape and a crest portion of the driving cam 81 has on oval shape and the root and crest portions connect to constitute a tangential cam. The driving cam 83 is mounted on an uppermost portion of the cam shaft 541 with such an arrangement that the crest portion of the driving cam 81 engages the horizontal rod 52 of the head base 32 when the solenoid lever 87 engages the claw portion 561 corresponding to the recording and reproducing position of the set cam 83 and the root portion of the driving cam 81 engages the head base 32 when the solenoid lever 87 engages the claw portion 563 corresponding to the fast forward and rewind position of the set cam 83.

The selector cam 82 has a projection 551 at an outer peripheral portion thereof for engaging one end of the lever 85 of the driving gear 86 to push the driving gear 86 against the elevator cam 63. But the outer peripheral portion of the selector cam 82 as a whole has a smoothly curved shape. The projection 551 is made up of an operating slope surface 552 defined by a flat top portion and a smooth curved surface, and a returning slope surface 553 defined by a flat sloping surface. The selector cam 82 is arranged on the cam shaft 541 below the driving cam 81, so that the projection 551 pushes against the lever 85 of the driving gear 86 when the solenoid lever 87 engages a claw portion 562 corresponding to the cassette changing position of the set cam 83.

The claw portions 561, 562 and 563 are formed at three positions on the outer peripheral portion of the set cam 83. The claw portions 561, 562 and 563 satisfy a positional relationship indicated by a phantom line in FIG. 5 at the recording and reproducing position, the cassette changing position, and the fast forward and rewind position. One of these three positions is selected when a corresponding one of the claw portions 561, 562 and 563 engages the solenoid lever 87.

The set cam 83 is supported on the cam shaft 541 below the selector cam 82. As shown in FIG. 5, teeth for meshing a gear 103 mounted on a capstan shaft 101 are formed on the outer periphery of the gear cam 84. A portion of the teeth of the gear cam 84 is cut out in the form of a cutout. When the set cam 83 is set to the recording and reproducing position, the cassette changing position, and the fast forward and rewind position, the gear on the capstan shaft 101 confronts the cutout and the teeth of the gear cam 84 are disengaged from the gear on the capstan shaft 101. The teeth and the cutout of the gear cam 84 are formed with such dimensions that the teeth of the gear cam 84 mesh the gear on the capstan shaft 101 only when the set cam 83 is moved from the fast forward and rewind position to the recording and reproducing position. The gear cam 84 is supported on the cam shaft 541 between the selector cam 82 and the set cam 83. The driving cam 81, the selector cam 82 and the set cam 84 rotate unitarily in a state maintaining the positional relationship shown in FIG. 5.

The lever 85 is rotatably supported on the lower frame 42 by the pin 581 which penetrates a central portion of the lever 85. One end of the lever 85 is constantly engaged to the selector cam 82 by the action of a spring 90 which is provided between the lower frame 42 and the lever 55 to push the lever 85 against the outer periphery of the selector cam 82. A shaft 92 is rotatably provided on the other end of the lever 85. The driving gear 86 is mounted on an upper portion of the shaft 92. The driving gear 86 meshes the elevator cam gear 362 to rotate the elevator cam 63 when one end of the lever 85 engages the projection 551 of the selector cam 82. As shown in FIG. 4, a driving gear wheel 91 is mounted on a lower portion of the shaft 92. The driving gear wheel 91 is belt-driven by a motor 108 to rotate the driving gear 86. In place of the lever 85 and the driving gear 86, it is possible to provide an independent motor (not shown) exclusively for driving the elevator cam 63.

As shown in FIG. 5, the solenoid lever 87 is arranged at such a position that one end thereof engages the claw portion of the set cam 83, and the central portion of the solenoid lever 87 is rotatably supported on the lower frame 42. The other end of the solenoid lever B7 is connected by a pin to an end portion of a plunger 611 of the solenoid 88 which is fixed on the lower frame 42. In addition, the spring 89 is provided between the lever 87 and the lower frame 42 so as to push one end of the lever 87 against the set cam 83.

In FIGS. 3, 4, 6A and 6B, the tape driving mechanism 37 has a known construction. The tape driving mechanism 37 comprises the capstan 101, a flywheel 102, a capstan gear 103, a center gear 751, two idle gears 771 and 772, the supply reel drive sprocket 105a, the take up reel drive sprocket 105b, a belt 106, a motor pulley 107 and the motor 108. The capstan 101 is rotatably mounted on an upper surface of the lower frame 42 adjacent to the driving cam 81 and engages the pinch roller 56. The flywheel 102 is fixed coaxially to the capstan 101 and rotates the capstan 101. The capstan gear 103 is mounted coaxially to the capstan 101 and rotates by meshing the gear cam 84. The center gear 751 is mounted coaxially to the capstan 101 and rotates together with the flywheel 102 to drive one of the reel drive sprockets 105a and 105b. The idle gears 771 and 772 transmit the rotation of the center gear 751 to the corresponding reel drive sprockets 105a and 105b. The supply and take-up reel drive sprockets 105a and 105b respectively enter holes T1a and T1b in the cassette tape cartridge containing tape T1 to transport e tape The belt 106 transmits the rotation of the motor 108 to the flywheel 102. The motor pulley 107 is fixed on a motor shaft of the motor 108 and engages the belt 106 to rotate the flywheel 102 and the driving gear wheel 91.

The capstan 101 is a narrow straight shaft having a polished outer surface. An upper end of the capstan 101 extends upwardly from the below the lower frame 42 through a slide bearing 741 which is mounted on the lower frame 42, so that the capstan 101 enters the small hole T1c in the cassette tape cartridge containing tape T1 when the cassette tape T1 is set in the normal operating position. A lower end of the capstan 101 is located below the lower frame 42 and is mounted with the flywheel 102 and the center gear 751 which is fixed to an upper surface of the flywheel 102. The flywheel 102 and the center gear 751 may be formed unitarily.

Figure 6A:
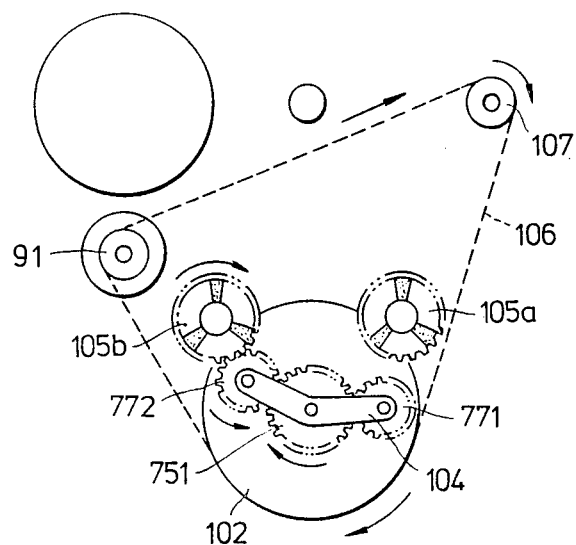
FIG. 6A and 6B are plan views respectively showing an essential part of the driving mechanism in a recording and reproducing mode and a rewind mode.
Figure 6B:
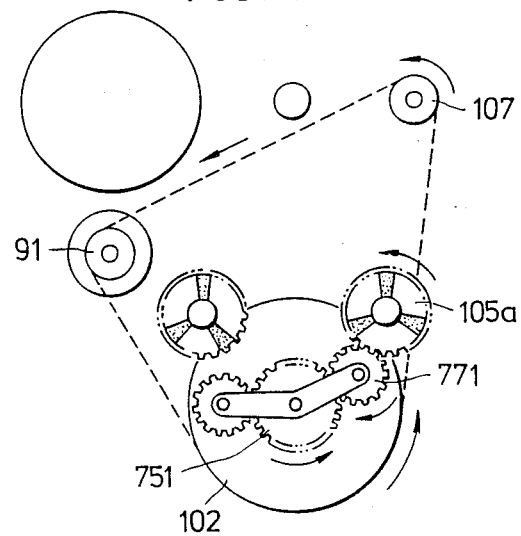

The capstan gear 103 is mounted coaxially to the capstan 101 on the lower frame 42 and rotates together with the capstan 101. The capstan gear 103 meshes and rotates the gear cam 84. The idle gears 771 and 772 are arranged between the lower frame 42 and the flywheel 102 as shown in FIGS. 4, 6A and 6B, and are rotably supported on respective ends of the arm 104. The arm 104 is rotably and coaxially mounted on the capstan 101. The center gear 751 is centered with respect to the idle gears 771 and 772 and engaged thereby.

The supply and take-up reel drive sprockets 105a and 105b respectively have pinions on lower ends thereof for meshing the idle gears 771 and 772. Upper ends of the supply and take-up reel drive sprockets 105a and 105b extend upwardly through bearings mounted on the lower frame 42, and enter the holes T1a and T1b of the cassette tape cartridge containing tape T1. The belt 106 is provided over the flywheel 102, the driving gear wheel 91 and the motor pulley 107 to transmit the driving force of the motor 108 to the flywheel 102 and the driving gear wheel 91.

Figure 9A:
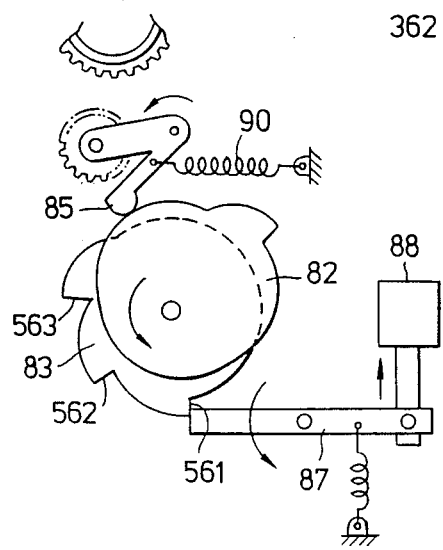
FIGS. 9A, 9B and 9C are plan views respectively showing the relationship of a selector cam and a drive gear in the recording and reproducing position. The cassette chancing position, and the fast forward and rewind position.

Next, a description will be given on the operation of the changing mechanism is relation to the tape cartridge apparatus 31. In the normal operating state shown in FIG. 7A, the claw portion 561 of the set cam 83 corresponding to the recording and reproducing position engages the solenoid lever 87. In this state, the crest portion of the driving cam 81 engages the horizontal rod 52 of the head base 32, and the driving cam 81 pushes the head base 32 against the cassette tape T1 against the force exerted by the spring 58 of the head base 32, and the head base 32 is in an operating position. As shown in FIG. 9A which will be described later, the lever 85 engages the root portion of the cam surface of the selector cam 82 due to the spring force of the spring 90, and the lever 85 takes a position separated from the elevator cam gear 362. In this state, the pinion 343 of the tape holder 61 engages the root portion 364 of the cam surface 366 of the elevator cam 63 and is lowered. The cassette tape T1 is set in the predetermine operating position where the supply and take-up reel drive sprockets 105a and 105b are inserted into the respective holes T1a and T1b of the cassette tape T1. The tape cartridge apparatus 31 is capable of carrying out normal recording and reproduction on the cassette tape T1.

Figure 9B:
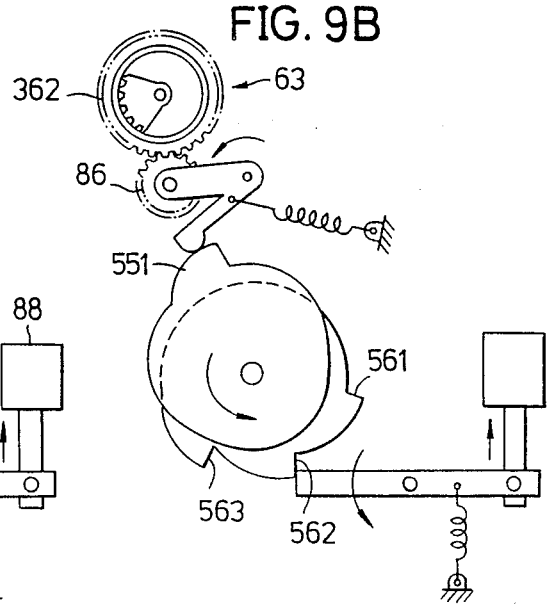
Figure 9C:
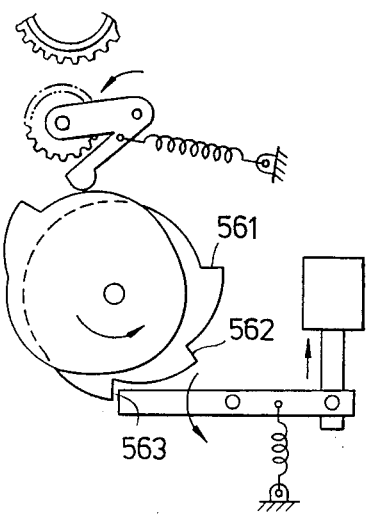

When chancing the cassette tape from the cassette tape T1 to the a cassette tape T2, for example, the solenoid 88 is excited by an instruction signal INST from a control circuit (not shown) of the tape cartridge apparatus 31 so as to disengage the solenoid lever 87 from the claw portion 561 of the set cam 83 corresponding to the recording and reproducing position. In addition, the rotation of the motor 108 is stopped. Since the solenoid 88 is deenergized within a short time, the solenoid 88 returns to the original position due to the force exerted by the spring 89. The restoration force of the spring 58 acts on the head base 32 to recede from the cassette tape to a receded position, simultaneously as when the solenoid lever 87 and the claw portion 561 of the set cam 83 disengage. As a result, the driving cam 81 rotates counterclockwise, thereby engaging the horizontal rod 52 of the head base 32 to the root portion of the cam 81. In addition, the pinch roller 56 and the heads 54 and 55 recede in a direction of the arrow in FIG. 7B so as to separate from the cassette tape. In this state, the set cam 83 becomes linked to the driving cam 81 and rotates therewith as shown in FIG. 9B, and the claw portion 562 of the set cam 83 corresponding to the cassette changing position engages the solenoid lever 87. Furthermore, the selector cam 82 also links to the driving cam 81 to rotate therewith, and the projection 551 of the selector cam 82 engages the lever 85.

Figure 8A:
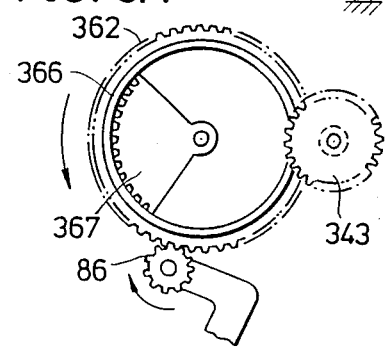
FIGS. 8A, 8B and 8C are a plan view and side views respectively showing the positional relationship of an elevator cam and a tape holder along a line S—S in FIG. 8B, in the normal state, and the cassette chancing state.
Figure 8B:
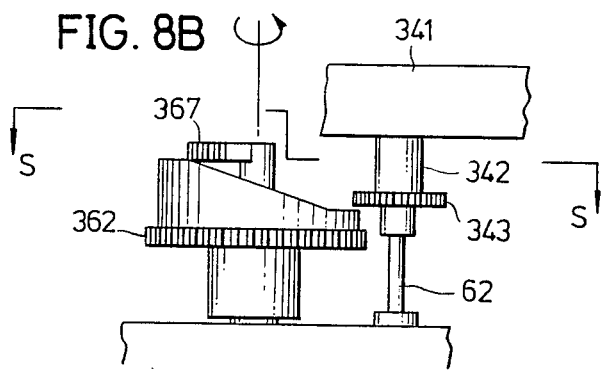

Accordingly, the lever 85 pushes against the driving gear 86 against the force of the spring 90, and the driving gear 86 meshes the gear 352 of the elevator cam 63. In this state, the motor 108 starts to rotate responsive to a manipulation of an external switch (not shown). The motor 108 rotate the elevator cam 63 by way of the motor pulley 107, the belt 106, the driving gear wheel 91 and the driving gear 86. The tape holder 61 in the normal operating state shown in FIGS. 8A and 8B engages the root portion 364 of the cam surface 366 of the elevator cam 63, but the tape holder 61 rises as the elevator cam 63 rotates through the engagement with the slope portion 365 of the cam surface 366.

Figure 8C:
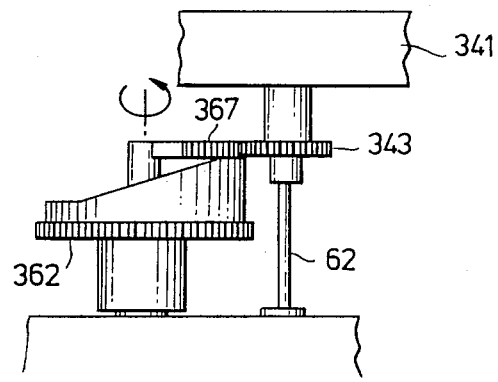

When the raising of the tape holder 61 is completed as shown in FIG. 8C, the pinion 343 of the tape holder 61 meshes the selector gear 367 of the elevator cam 63, thereby rotating the tape holder 61. In this state where the raising of the tape holder 61 is completed, the tape holder 61 can rotate because the supply and take-up reel drive sprockets 105a and 105b and the capstan 101 escape from the respective holes T1a, T1b and T1c of the cassette tape cartridge containing tape T1. When the tape holder 61 rotates 180°, the selector gear 367 disengages from the pinion 343 and the tape holder 61 is prevented from further rotation by a stopper (not shown). However, the elevator cam 63 continues to rotate, and the lower surface of the pinion 343 again engages the slope portion 365 of the cam surface 366. The pinion 343 moves downwardly to again engage the root portion 364 of the cam surface 366. The motor 108 is stopped in this state to stop the rotation of the elevator cam 63, and the changing of the cassette tape is completed. As a result, the cassette tape cartridge containing tape T2 is set in the predetermined operating position.

Figure 7C:
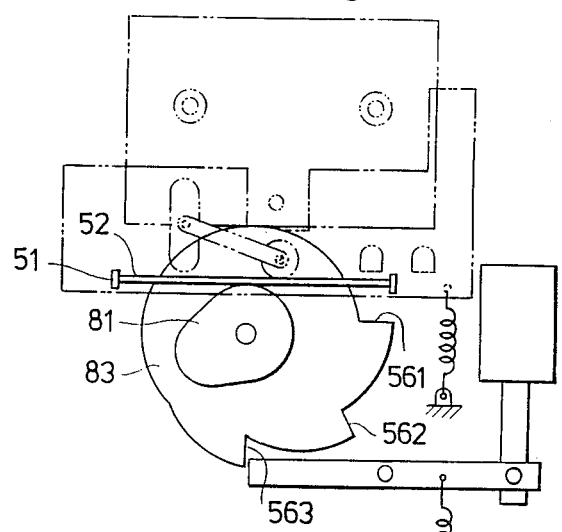

The return of the tape holder 61 to the normal position is detected by a limit switch (not shown). The motor 108 is stopped by the activation of the limit switch, and at the same time, the solenoid 88 is excited to pull one end of the lever 87. Hence, the other end of the lever 87 is released from the claw portion 562 of the set cam 83 corresponding to the cassette changing position. As a result, the driving cam 81 is pushed by the horizontal rod 52 of the head base 32 and rotated thereby as shown in FIG. 7C, and the set cam 83 also rotates until the driving cam 81 engages the claw portion 563 corresponding to the fast forward and rewind position and stops. In this case, the driving gear 86 separates from the gear 362 of the elevator cam 63 due to the restoration force of the spring 90. At the fast forward and rewind position, the motor 108 rotates to carry out the fast forward or rewind operation responsive to an external instruction signal EXT or a manipulation of a manual button MB (not shown) on the cassette apparatus, 31.

Figure 10A:
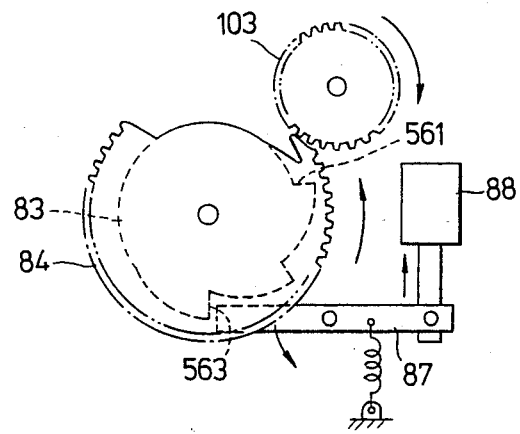
FIGS. 10A and 10B are plan views respectively showing the positional relationship of the selector cam and a gear cam in the fast forward and rewind mode and after changing to the recording and reproducing mode.
Figure 10B:
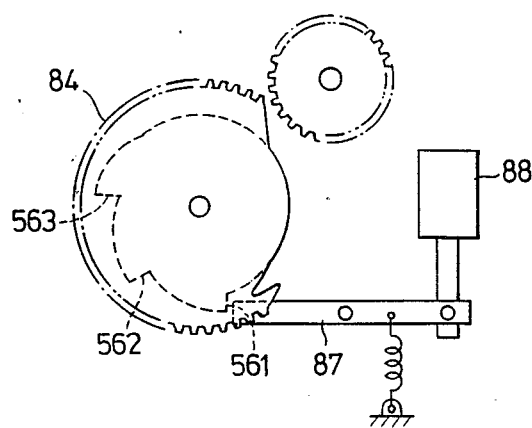

When changing the position from the fast forward and rewind position to the normal recording and reproducing position, the solenoid 88 is excited responsive to the instruction signal INST from the control circuit of the tape cartridge apparatus 31 or an external instruction signal so as to pull one end of the lever 87. Accordingly, the other end of the lever 87 is released from the claw portion 563 of the set cam 83. At the same time, the motor 108 starts to rotate. In this state, the gear cam 84 meshes the capstan gear 103 as shown in FIG. 10A, and the gear cam 84 is rotated counterclockwise by the motor 108 by way of the capstan gear 103. The set cam 83 is linked and rotated with the gear cam 84, and is stopped when the claw portion 561 of the set cam 83 corresponding to the recording and reproducing position engages the lever 87. In this state, the capstan gear 103 disengages from the gear cam 84 as shown in FIG. 10B. Similarly, the drive cam 81 is linked and rotated with the gear cam 84, and as shown in FIG. 7A, the drive cam 81 is stopped when the crest portion of the drive cam 81 engages the horizontal rod 52 of the head base 32. In addition, the heads 54 and 55 on the head base 32 in the operating position engage the tape of the cassette tape, and the tape is pinched between the pinch roller 56 and the capstan 101. The move to the recording and reproducing position is completed in this manner.

As described heretofore, the changing mechanism sequentially assumes the "recording and reproducing position", the "cassette changing position", the "fast forward and rewind position", the "recording and reproducing position", .... The rotation of the motor 108 is stopped during a transition time between two different positions (modes). Accordingly, even when the set cam 83 is set from the recording and reproducing position to the fast forward and rewind position, the changing mechanism will not assume the cassette chancing position although the set cam 83 passes the cassette changing position because the motor 108 is stopped during the transition time.

The tape driving mechanism 37 is operated at the recording and reproducing position 561 and the fast forward and rewind position 563 of the set cam 83. When rotating the take-up reel drive sprocket 105b in the fast forward mode, the motor 108 rotates in a forward direction (clockwise) in FIG. 6A. The flywheel 102 is rotated by way of the belt 106 and drives the center gear 751. The idle gear 772 is rotated by the center gear 751. In this state, the arm 104 is rotated by the driving force of the center gear 751, and the gear of the take-up reel drive sprocket 105b is meshes the idle gear 772. Hence, the take-up reel drive sprocket 105b is rotated. The motor 108 rotates in a reverse direction (counterclockwise) in FIG. 6B in the rewind mode. In this case, the center gear 751 is similarly rotated by way of the belt 106 and the flywheel 102. The arm 104 is rotated in a reverse direction by the driving force of the center gear 751, thereby meshing the idle gear 771 to the gear of the supply reel drive sprocket 105a. Therefore, the supply reel 105a is rotated.

Figure 11:
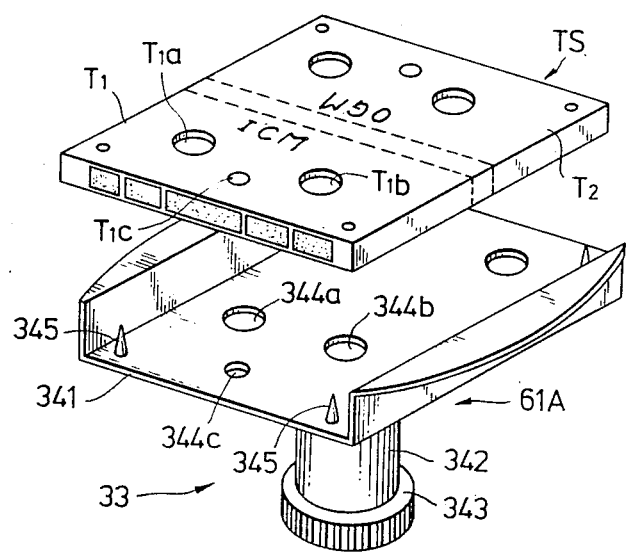
FIG. 11 is a disassembled perspective view showing an essential part of a second embodiment of the tape cartridge apparatus according to the present invention.

FIG. 11 shows an essential part of a second embodiment of the tape cartridge apparatus according to the present invention. In FIG. 11, those parts which are essentially the same as those corresponding parts in FIG. 3 are designated by the same reference numerals, and a description thereof will be omitted. In the present embodiment, a tape holder 61A is designed to receive a single cassette tape structure TS integrally comprising the cassette tapes T1 and T2. Hence, it is not essential to provide a partitioning plate on the tape holder 61A.

Therefore, according to the embodiments described heretofore, it is possible to selectively play and/or record on one of the two cassette tapes T1 and T2 by rotating the tape holder 61 (or 61A) 180° by use of the changing mechanism having a simple construction. It is sufficient to provide only one tape driving mechanism 37 and only one head base 32 mounted with the heads 54 and 55 and the like. For this reason, it is possible to considerably reduce the number of parts and accordingly reduce the production cost of the tape cartridge apparatus. In addition, it is possible to downsize the tape cartridge apparatus as a whole because of the reduced number of parts.

The number of cassette tapes held on the tape holder is of course not limited to two, and the rotation angle of the tape holder in the cassette changing mode depends on the number of cassette tapes and the arrangement of the cassette tapes on the tape holder.

Further, the present invention is not limited to these embodiments, but various variations and modifications may be made without departing from the scope of the present invention.

What is claimed is:

1. A tape cartridge apparatus for recording a signal on and reproducing a signal from a tape that is disposed in a selected one of a plurality of cassette tape cartridge means that are set therein, said tape cartridge apparatus comprising:

a frame;

a head base provided on said frame, said head base being slidable in a first plane between an operating position and a receded position, said head base comprising at least a recording and reproducing head for recording a signal on and reproducing a signal from a tape in a first predetermined cassette tape cartridge means that is disposed in a normal operating position;

a tape cartridge holder provided on said frame for holding said plurality of cassette tape cartridge means, said tape holder being rotatable and movable up and down with respect to said frame, said first predetermined cassette tape cartridge means being set in said normal operating position when said holder takes a first rotary position;

an elevator mechanism for raising and lowering said tape holder between a lowered position and a raised position in a cassette changing mode in which a selection of cassette tape cartridge means is made, said elevator mechanism raising and lowering said tape holder in a linear direction and along a line substantially perpendicular to the first plane throughout the movement thereof;

a rotating mechanism for rotating said tape holder in the raised position a predetermined angle in the cassette changing mode;

and a moving mechanism for moving said head base between the operating position and the receded position, said moving mechanism first moving said head base to the receded position in the cassette changing mode so that said tape holder in the raised position is rotated said predetermined angle to a second rotary position and then returning said head base to the operating position when said tape holder returns to the lowered position, thereby setting a cassette tape cartridge means other than said first predetermined cassette tape cartridge means in said normal operating position.

2. A tape cartridge apparatus as claimed in claim 1 in which said elevator mechanism comprises an elevator cam rotatably provided on said frame and having a cam surface engaged to said tape holder, said cam surface being made up of a crest portion, a root portion and a slope portions connecting said crest and root portions, said crest portion being in contact with said tape holder in the raised position, said root portion being in contact with said tape holder in the lowered position, said slope portions being in contact with said tape holder during raising and lowering.

3. A tape cartridge apparatus as claimed in claim 1 which further comprises a tape driving mechanism for driving the tape in said predetermined tape cartridge, said tape driving mechanism comprising a capstan rotatably provided on said frame and a pinch roller provided on said head base, said capstan and said pinch roller driving the tape in said predetermined cassette tape in a state where the tape is pinched between said capstan and said pinch roller.

4. A tape cartridge apparatus as claimed in claim 1 in which said tape holder comprises positioning means for positioning said plurality of tape cartridge means, so that said plurality of tape cartridge means are prevented from slipping out of position during a rotation of said tape holder and in said cassette changing mode.

5. A tape cartridge apparatus as claimed in claim 1 in which said moving mechanism comprises a set cam having first and second portions for acting on said head base, said first portion acting on said head base to maintain said head base in the receded position in the cassette changing mode, said second portion acting on said head base to maintain said head base in the operating position in a recording and reproducing mode in which said recording and reproducing means records and reproduces the signal on and from the tape in said predetermined cassette tape.

6. A tape cartridge apparatus as claimed in claim 1 in which said tape holder holds two tape cartridge means in a state where tapes of said two tape cartridge means are exposed to the outside in mutually opposite directions.

7. A tape cartridge apparatus for recording a signal on and reproducing a signal from a tape that is disposed in a selected one of a plurality of cassette tape cartridge means that are set therein, said tape cartridge apparatus comprising:
a frame;
a head base provided on said frame and slidable between an operating position and a receded position, said head base comprising at least a recording and reproducing head for recording a signal on and reproducing a signal from a tape in a first predetermined cassette tape cartridge means that is disposed in a normal operating position;
a tape cartridge holder provided on said frame for holding said plurality of cassette tape cartridge means, said tape holder being rotatable and movable up and down with respect to said frame, said first predetermined cassette tape cartridge means being set in a normal operating position when said holder takes a first rotary position;
an elevator mechanism for raising and lowering said tape holder between a lowered position and a raised position in a cassette changing mode in which a selection of cassette tape cartridge means is made, said elevator mechanism comprising an elevator cam rotatably provided on said frame and having a cam surface engaged to said tape holder, said cam surface being made up of a crest portion, a root portion and slope portions connecting said crest and root portions, said crest portion being in contact with said tape holder in the raised position, said root portion being in contact with said tape holder in the lowered position, and said slope portion being in contact with said tape holder during raising and lowering;
a rotating mechanism for rotating said tape holder in the operating position a predetermined angle in the cassette changing mode;
a moving mechanism for moving said head base between the operating position and the receded position, said moving mechanism first moving said head base to the receded position in the cassette changing mode so that said tape holder in the raised position is rotated said predetermined angle to a second rotary position and then returning said head base to the operating position when said tape holder turns to the lowered position, thereby setting a cassette tape cartridge means other than said first predetermined cassette tape cartridge means in said normal operating position; and
said tape holder comprises a gear fixed thereto and said rotating mechanism comprises a selector cam fixed on said elevator cam, said selector gear meshing with said gear of said tape holder to rotate said tape holder said predetermined angle only when said tape holder is raised to the raised position by said elevator cam of said elevator mechanism.

8. A tape cartridge apparatus as claimed in claim 7 in which said selector gear has a fan shape.

9. A tape cartridge apparatus for recording a signal on and reproducing a signal from a tape that is disposed in a selected one of a plurality of cassette tape cartridge means that are set therein, said tape cartridge apparatus comprising:
a frame;
a head base provided on said frame and slidable between an operating position and a receded position, said head base comprising at least a recording and reproducing head for recording a signal on and reproducing a signal from a tape in a first predetermined cassette tape cartridge means that is disposed in a normal operating position;
a tape cartridge holder provided on said frame for holding said plurality of tape cartridge means, said tape holder being rotatable and movable up and down with respect to said frame, said first predetermined cassette tape cartridge means being set in said normal operating position when said holder takes a first rotary position;
an elevator mechanism for raising and lowering said tape holder between a lowered position and a raised position in a cassette changing mode in which a selection of cassette tape cartridge means is made;
a rotating mechanism for rotating said tape holder in the raised position a predetermined angle in the cassette changing mode;
a moving mechanism for moving said head base between the operating position and the receded position, said moving mechanism first moving said head base to the receded position in the cassette changing mode so that said tape holder in the raised position is rotated said predetermined angle to a second rotary position and then returning said head base to the operating position when said tape holder returns to the lowered position, thereby setting a cassette tape cartridge means other than said first predetermined cassette tape cartridge means in said normal operating position; and a single motor which is used in common for driving said elevator mechanism, said rotating mechanism and said moving mechanism.

10. A tape cartridge apparatus for recording and reproducing a signal on and from a tape in a selected one of a plurality of cassette tapes which are integral parts of a single tape cartridge set in said tape cartridge apparatus, said tape cartridge apparatus comprising:
   a frame;
   a head base provided on said frame and slidable between an operating position and a receded position, said head base comprising at least a recording and reproducing head for recording and reproducing a signal on and from a first predetermined cassette tape of said cassette tape cartridge in a normal operating position;
   a tape cartridge holder provided on said frame for holding said cassette tape cartridge, said tape holder being rotatable and movable up and down with respect to said frame, said first predetermined cassette tape being set in said normal operating position when said holder takes a first rotary position;
   an elevator mechanism for raising and lowering said tape holder between a lowered position and a raised position in a cassette changing mode in which a selection of a cassette tape is made;
   a rotating mechanism for rotating said tape holder in the raised position a predetermined angle in the cassette changing mode; and
   a moving mechanism for moving said head base between the operating position and the receded position;
   said moving mechanism first moving said head base to the receded position in the cassette changing mode so that said tape holder in the raised position is rotated said predetermined angle to a second rotary position and then returning said head base to the operating position when said tape holder returns to the lowered position, thereby setting a cassette tape of said cassette tape cartridge other than said first predetermined cassette tape in said normal operating position.

11. A tape cartridge apparatus as claimed in claim 10 in which said elevator mechanism comprises an elevator cam rotatably provided on said frame and having a cam surface engaged to said tape holder, said cam surface being made up of a crest portion, a root portion and slope portions connecting said crest and root portions, said crest portion being in contact with said tape holder in the raised position, said root portion being in contact with said tape holder in the lowered position, said slope portions being in contact with said tape holder during raising and lowering.

12. A tape cartridge apparatus as claimed in claim 11 in which said tape holder comprises a gear fixed thereto and said rotating mechanism comprises a selector cam fixed on said elevator cam, said selector gear meshing said gear of said, tape holder to rotate said tape holder said predetermined angle only when said tape holder is raised to the raised position by said elevator cam of said elevator mechanism.

13. A tape cartridge apparatus as claimed in claim 12 in which said selector gear has a fan shape.

14. A tape cartridge apparatus as claimed in claim 10 in which said moving mechanism comprises a set cam having first and second portions for acting on said head base, said first portion acting on said head base to maintain said head base in the receded position in the cassette changing mode, said second portion acting on said head base to maintain said head base in the operating position in a recording and reproducing mode in which said recording and reproducing means records and reproduces the signal on and from the tape in said predetermined cassette tape.

15. A tape cartridge apparatus as claimed in claim 10 which further comprises a single motor which is used in common for driving said elevator mechanism, said rotating mechanism and said moving mechanism.

16. A tape cartridge apparatus as claimed in claim 10 which further comprises a tape driving mechanism for driving the tape in said predetermined cassette tape, said tape driving mechanism comprising a capstan rotatably provided on said frame and a pinch roller provided on said head base, said capstan and said pinch roller driving the tape in said predetermined cassette tape in a state where the tape is pinched between said capstan and said pinch roller.

17. A tape cartridge apparatus as claimed in claim 10 in which said tape holder comprises positioning means for positioning said plurality of cassette tapes, so that said plurality of cassette tapes are prevented from slipping out of position during a rotation of said tape holder in said cassette changing mode.

18. A tape cartridge apparatus as claimed in claim 10 in which said tape holder holds two cassette tapes in a state where tapes of said two cassette tapes are exposed to outside in mutually opposite direction.

19. A tape cartridge apparatus for recording and reproducing a signal on and from a selected one of a plurality of cassette tapes that are supported in said tape cartridge apparatus, said tape cartridge apparatus comprising:
   a frame;
   a head base provided on said frame and slidable in a first plane, said head base comprising at least a recording and reproducing head for recording and reproducing a signal on and from a first predetermined tape in a predetermined cassette operating position;
   a tape holder provided on said frame for holding said plurality of cassette tapes, said first predetermined cassette tape being set in said normal operating position when said holder assumes a first rotary position;
   means for raising and lowering said tape holder between a lowered position and a raised position in a cassette changing mode in which a selection of a tape cassette is made, said means for raising and lowering for moving said tape holder along a direction substantially perpendicular to the first plane;
   means for rotating said tape holder in the raised position through a predetermined angle in the cassette changing mode; and
   said means for rotating being operable when the tape holder is in the raised position so as to rotate through said predetermined angle to a second rotary position, thereby setting a cassette tape other than said first predetermined cassette tape in said normal operating position.

20. A tape cartridge apparatus as set forth in claim 19 further including means for moving said head base between the operating position and a receded position, said means for moving first moving said head base to the receded position in the cassette changing mode so that said tape holder in the raised position is rotated in said predetermined angle to the second rotary position and then returning said head base to the operating position when said tape holder returns to the lowered position.

21. A tape cartridge apparatus as set forth in claim 20 wherein said means for raising and lowering comprises an elevator mechanism, said means for rotating comprises a rotating mechanism, and said means for moving comprises a moving mechanism.

22. A tape cartridge apparatus as claimed in claim 21 in which said elevator mechanism comprises an elevator cam rotatably provided on said frame and having a cam surface engaged to said tape holder, said cam surface being made up of a crest portion, a root portion and slope portions connecting said crest and root portions, said crest portion being in contact with said tape holder in the raised position, said root portion being in contact with said tape holder in the lowered position.

23. A tape cartridge apparatus as claimed in claim 21 which further comprises a tape driving mechanism for driving the tape in said predetermined cassette tape, said tape driving mechanism comprising a capstan rotatably provided on said frame and a pinch roller provided on said head base, said capstan and said pinch roller driving the tape in said predetermined cassette tape in a state where the tape is pinched between said capstan and said pinch roller.

24. A tape cartridge apparatus as claimed in claim 21 in which said tape holder comprises positioning means for positioning said plurality of cassette tapes, so that said plurality of cassette tapes are prevented from slipping out of position during a rotation of said tape holder in said cassette changing mode.

25. A tape cartridge apparatus as claimed in claim 21 in which said moving mechanism comprises a set cam having first and second portions for acting on said head base, said first portion acting on said head base to maintain said head base in the receded position in the cassette changing mode, said second portion acting on said head base to maintain said head base in the operating position in a recording and reproducing mode in which said recording and reproducing means records and reproduces the signal on and from the tape in said predetermined cassette tape.

26. A tape cartridge apparatus as claimed in claim 21 in which said tape holder holds two cassette tapes arranged in mutually opposite directions whereby said predetermined angle is 180°.

27. A tape cartridge apparatus for recording and reproducing a signal on and from a selected one of a plurality of cassette tapes that are supported in said tape cartridge apparatus, said tape cartridge apparatus comprising:
a frame;
a head base provided on said frame and comprising at least a recording and reproducing head for recording and reproducing a signal on and from a first predetermined tape in a predetermined cassette operating position;
a tape holder provided on said frame for holding said plurality of cassette tapes, said first predetermined cassette tape being set in said normal operating position when said holder assumes a first rotary position;
means for raising and lowering said tape holder between a lowered position and a raised position in a cassette changing mode in which a selection of a tape cassette is made;
means for rotating said tape holder in the raised position through a predetermined angle in the cassette changing mode, said means for rotating being operable when the tape holder is in the raised position so as to rotate through said predetermined angle to a second rotary position, thereby setting a cassette tape other than said first predetermined cassette tape in said normal operating position;
means for moving said head base between the operating position and the receded position, said means for moving first moving said head base to the receded position in the cassette changing mode so that said tape holder in the raised position is rotated in said predetermined angle to the second rotary position and then returning said head base to the operating position when said tape holder returns to the lowered position;
said means for raising and lowering comprising an elevator mechanism, said means for rotating comprising a rotating mechanism, said means for moving comprising a moving mechanism;
said elevator mechanism comprising an elevator cam rotatably provided on said frame and having a cam surface engaged to said tape holder, said cam surface being made up of a crest portion, a root portion and slope portions connecting said crest and root portions, said crest portion being in contact with said tape holder in the raised position, said root portion being in contact with said tape holder in the lowered position; and
said tape holder comprising a gear fixed thereto and said rotating mechanism comprises a selector cam fixed on said elevator cam, said selector gear meshing with said gear of said tape holder to rotate said tape holder said predetermined angle only when said tape holder is raised to the raised position by said elevator cam of said elevator mechanism.

28. A tape cartridge apparatus as claimed in claim 27 in which said selector gear has a fan shape.

29. A tape cartridge apparatus for recording and reproducing a signal on and from a select one of a plurality of cassette tapes that are supported in said tape cartridge apparatus, said tape cartridge apparatus comprising:
a frame;
a head base provided on said frame and comprising at least a recording and reproducing head for recording and reproducing a signal on and from a first predetermined tape in a predetermined cassette operating position;
a tape holder provided on said frame for holding said plurality of cassette tapes, said first predetermined cassette tape being set in said normal operating position when said holder assumes a first rotary position;
means for raising and lowering said tape holder between a lowered position and a raised position in a cassette changing mode in which a selection of a tape cassette is made;
means for rotating said tape holder in the raised position through a predetermined angle in the cassette changing mode, said means for rotating being operable when the tape holder is in the raised position so as to rotate through said predetermined angle to a second rotary position, thereby setting a cassette tape other than said first predetermined cassette tape in said normal operating position;

means for moving said head base between the operating position and the receded position, said means for moving first moving said head base to the receded position in the cassette changing mode so that said tape holder in the raised position is rotated in said predetermined angle to the second rotary position and then returning said head base to the operating position when said tape holder returns to the lowered position;

said means for raising and lowering comprising an elevator mechanism, said means for rotating comprising a rotating mechanism, said means for moving comprising a moving mechanism; and a single motor which is used in common for driving said elevator mechanism, said rotating mechanism and said moving mechanism.

30. A tape cartridge recording and reproducing apparatus for recording a signal on and reproducing a signal from a tape that is disposed in a selected one of a plurality of cassette tape cartridge means that are adapted to be set into the apparatus in different predetermined positions, said tape cartridge recording and reproducing apparatus comprising a frame, a head base provided on the frame and slidable in a first plane, said head base comprising at least a recording and reproducing head for recording and reproducing a signal on and from a tape in a first predetermined cassette tape cartridge means that is disposed in the normal operating position, a tape holder provided on said frame for holding said plurality of cassette tape cartridge means, said tape holder being movable substantially perpendicular with respect to the first plane, said first predetermined cassette cartridge means being set in said normal operating position when said holder assumes a first predetermined position, a means for moving the tape holder through a preselected distance in a cassette changing mode of operation, and means for controlling said means for moving so as to move said tape holder from said first predetermined position to a second predetermined position thereby setting a cassette tape other than that in said first predetermined cassette tape cartridge means in said normal operating position.

31. A tape cartridge recording and reproducing apparatus as claimed in claim 30 wherein said plurality of tape cartridge means comprises at least first and second recording and reproducing tapes and a unitary housing containing said respective first and second tapes.

32. A cassette cartridge recording and reproducing apparatus as claimed in claim 30 wherein said plurality of tape cartridge means comprises at least first and second tapes and separate tape housings for respective first and second tapes.

33. A tape cartridge recording and reproducing apparatus as claimed in claim 32 wherein said means for moving comprises means for rotating the tape holder through a predetermined angle.

34. A tape cartridge recording and reproducing apparatus as claimed in claim 33 wherein aid means for controlling further includes means for raising and lowering the tape holder between a lowered position and a raised position in a cassette changing mode in which a selection of a tape cassette is made.

35. A tape cartridge recording and reproducing apparatus as claimed in claim 30 wherein said means for controlling further includes means for raising and lowering the tape holder between a lowered position and a raised position in a cassette changing mode in which a selection of a tape cassette is made.

36. A tape cartridge recording and reproducing apparatus as claimed in claim 35 wherein said means for controlling further includes means for moving said head base between the operating position and a receded position, said means for first moving said head base to the receded position in the cassette changing mode so that said tape holder in the raised position is rotated in said predetermined angle to the second rotary position and then returning said head base to the operating position when said tape holder returns to the lowered position.

37. In combination, a tape cartridge apparatus and tape cartridge means, said tape cartridge apparatus for receiving of the tape cartridge means therein, and in which said tape cartridge apparatus includes a tape changing means so as to bring different tapes of a plurality thereof into an operative position, said tape cartridge means comprising, said tapes including at least a pair of recording and reproducing tapes, means for supporting each of the tapes to enable the tapes to be wound and unwound, a single unitary planar cartridge housing having two separate housing compartments for receiving respective tapes of said pair, and means for separately supporting said tapes in respective cartridge housing compartments, said cartridge housing having separate tape head access ports to provide access to the individual tape, wherein said access ports are disposed in mutually opposite directions.

38. A tape cartridge as claimed in claim 37 wherein each of said housing compartments includes a pair of openings to provide access to tape reels.

* * * * *